US006816110B1

United States Patent
Liu et al.

(12) United States Patent
(10) Patent No.: US 6,816,110 B1
(45) Date of Patent: Nov. 9, 2004

(54) PRECISION POSITIONING AGM SYSTEM

(75) Inventors: Ziwen W. Liu, Katy, TX (US); Alan P. Dean, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 10/629,747

(22) Filed: Jul. 30, 2003

(51) Int. Cl.[7] .................................................. H04B 7/85
(52) U.S. Cl. .............................. 342/357.03; 342/357.06
(58) Field of Search ........................ 342/357.01, 357.03, 342/357.06, 357.13; 701/213, 207

(56) References Cited

U.S. PATENT DOCUMENTS 6,023,986 A * 2/2000 Smith et al. ................ 73/866.5
6,553,322 B1 * 4/2003 Ignagni ........................ 702/34

FOREIGN PATENT DOCUMENTS

WO   WO 9932902 A2 *  7/1999

* cited by examiner

Primary Examiner—Dao Phan
(74) Attorney, Agent, or Firm—Finnegan, Henderson, Farabow, Garrett & Dunner LLP

(57) ABSTRACT

A precision positioning AGM system is provided for detecting the location of an AGM device, as well as the time of a smart pig passing the location. The practice combines two processes into one by using a GPS receiver at the AGM location to record raw GPS measurements at each AGM location. A second GPS receiver is provided at a remote known base location. These position signals and a pig-passage time signal from the AGM provide high accuracy positioning and pig passage time, with only one crew being required. These signals are broadcast to a remote monitoring site. This makes real-time pig tracking unnecessary and eliminates the need for more than one crew visiting the same site.

8 Claims, 1 Drawing Sheet

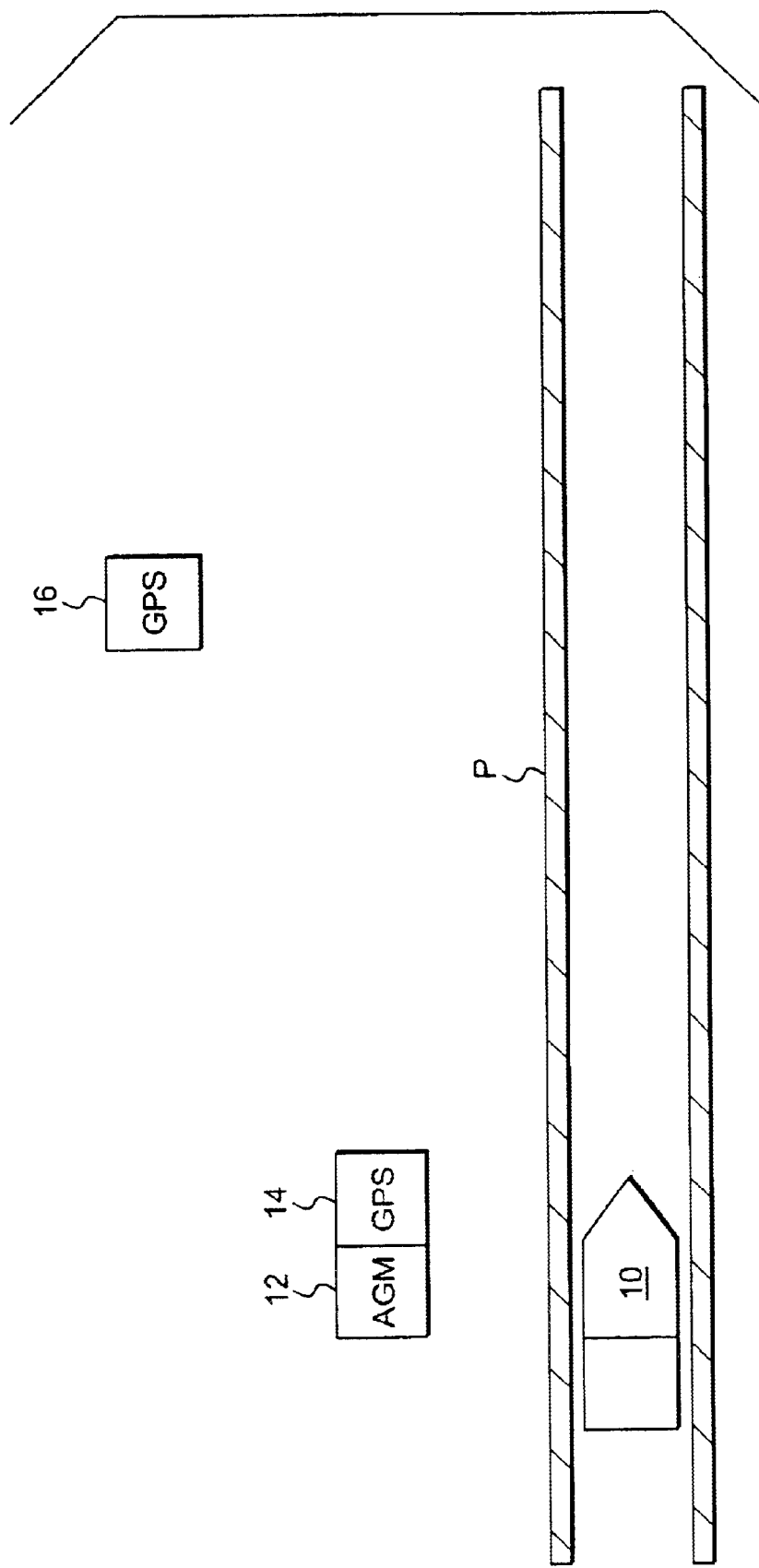

PRECISION POSITIONING AGM SYSTEM

DESCRIPTION OF THE INVENTION

1. Field of the Invention

The invention relates to a system for detecting the position of a device termed AGM, and the time that a smart pig moving through a pipeline passes the position of the AGM.

2. Background of the Invention

An Above Ground Marker (AGM) is typically used in pipeline applications involving the use of a device that passes through the pipeline to collect various data with respect to the condition of the pipeline, such as corrosion, deformation and the like. These devices are commonly termed a "smart pig".

A conventional AGM is placed on top of a pipeline and detects the time when a pig passes by the AGM location in the pipeline. The AGM typically has an internal logic system to detect and record the time of the pig pass. The position of the AGM, however, must be determined by a global positioning system (GPS). This conventional practice has two significant disadvantages. The first one is that two separate crews are required. One crew must determine the position of the AGM and the other the time of the pig passage.

A GPS receiver produces two types of measurements, one termed "pseudo-range" and another termed "carrier phase". These measurements provide information regarding the distance from a satellite to the receiver antenna. These measurements, however, contain errors caused by block biases in the satellite and receiver, atmospheric delays, and multi-path effects. With pseudo-range measurements the absolute distance is determined but a noise level of several meters is present. The carrier phase measurement has a noise level of only a few millimeters but provides only relative distance measurement. There are basically three techniques for using these GPS measurements that are single point "stand-alone" positioning, differential positioning "DGPS" and kinematic positioning "geodetic surveying".

With single point positioning, only one receiver is employed. This receiver provides only pseudo-range measurements. With this practice, with a minimum of four satellites being visible, the position of the receiver can be computed by triangulation. Imperfect modeling is employed to remove system propagation errors, but the removal is incomplete. The resulting residual range error and the random noise of the measurement results in a final positioning accuracy of about 10 meters horizontally and 15 meters vertically. This accuracy is not sufficient for effective detection of a position of a smart pig moving through a pipeline.

To enhance the position accuracy, differential positioning "DGPS" is employed. With this technique, a receiver termed "base" occupies a known location so that the actual errors in each range measurement can be accurately computed. This range correction is applied to each "rover" receiver range measurement to remove the error components that are common to both the base receiver station and the rover receiver station. With this practice, only geometrical information is provided by the rover receiver measurements regarding its position so that the final triangulation is free of errors that are common to both receivers. Although this practice can provide position error of meter to sub-meter levels, it is nevertheless not sufficient for the required position detecting of a smart pig moving through a pipeline.

With kinematic positioning the GPS uses a carrier phase measurement. This constitutes a continuous count of carrier waves beginning with the first signal lock. As a receiver/satellite range measurement it provides only relative changes occurring after the first lock. Consequently, the initial integer count, termed "initial ambiguity", is unknown. Consequently, to effectively use the carrier phase measurement, the initial ambiguity must be resolved. To remove this and other error components contained in the pseudo-range, double differencing is used. With this procedure, carrier phase measurements are first differenced between two receivers, and then between satellites for the rover receiver. These measurements are free of errors, such as satellite and receiver clock biases, satellite orbit errors, ionospheric and thropospheric delays. Once these double differenced initial ambiguities are resolved, the double differenced carrier phase measurements will provide type centimeter-level positioning results. Unlike single point and differential positioning techniques, kinematic positioning requires post-mission processing, and thus the use of two crews. This results because the resolution of the initial ambiguities requires further processing and a determination of the geometry change of the satellite. This practice requires an extended time interval.

With the two-crew practice, one AGM crew installs the AGM devices to record time of pig passage and another GPS crew is required to survey the AGM locations by recording raw GPS measurements at each location. These recorded GPS measurements are then processed as discussed above to achieve centimeter-level accuracy.

With the practice of the invention these two processes are combined by using a GPS receiver at the AGM location, and recording raw GPS measurements at each location. In addition, a remote notification function may be included at the AGM location. This may constitute a cellular telephone or a satellite link to a remote monitoring site that is activated by the AGM when the pig passes the AGM location to broadcast in real time the time of passage of the pig and AGM position. Hence, only one crew is required to achieve both high accuracy positioning and pig passage time.

OBJECTS OF THE INVENTION

It is accordingly an.object of the present invention to provide for the time and position marking by a single apparatus so that the position of the AGM only has to be occupied once, with only a single crew being required.

SUMMARY OF THE INVENTION

In accordance with the invention there is provided an apparatus for detecting the position of a device, such as a smart pig, moving through a pipeline. The apparatus includes means positioned at a first location above the pipeline for producing a first electrical signal in response to passage of the device through the pipeline at the first location and a second signal to activate a first global positioning system positioned at said first location to provide a third electrical signal indicating the position of said first location and a second global positioning system positioned at a second selected, known location remote from said first location to provide a fourth electrical signal to correct said third electrical signal.

The means for producing the first electrical signal may further include means for collecting and storing this first electrical signal.

The first electrical signal recording may be activated by the passage of the device through the pipeline at the first location.

The apparatus may further include a computer for collecting said first electrical signal, for collecting and carrier phased based double differencing said third and fourth electrical signals from the global positioning systems to provide a position signal of the first location and further for integrating the first electrical signal indicative of the time that the device passes the first location and the position signal to provide an indication of the time of the device passing this position of the first location along the pipeline.

The apparatus may comprise an above ground marker, positioned at a first location above the pipeline, for producing, collecting and storing a first electrical signal in response to and indicative of a time of passage of the device through the pipeline at the first location and a second signal to activate a first global positioning system positioned at the first location. A second global positioning system may be positioned at a selected, known location remote from the first location. The first and second global positioning systems may be each adapted for producing first and second electrical signals, respectively, indicating the respective positions of each of the global positioning systems. A computer may be used for collecting the first signal and carrier phased based double differencing the first and second signals from the global positioning systems to provide a position signal of the first location and for integrating the first electrical signal indicative of time of passage at the first location and the position signal to provide an indication of the time of the device passing the position of the first location. Means may be provided at the first location for real time broadcasting of time of passage of the device at this location and the position of this location to a remote monitoring site. This means may be activated by the AGM.

BRIEF DESCRIPTION OF THE DRAWING

The single FIGURE is a schematic showing of one embodiment of a precision positioning system in accordance with the invention.

DETAILED DESCRIPTION OF THE PREFERRED EMBODIMENT

With reference to the FIGURE, there is shown a pipeline designated as P through which a pig 10 is traveling. Above the pipeline P an above ground marker 12 and a global positioning system 14 are mounted at a common location. A second global positioning system 16 is mounted at a remote location from the AGM 12 and GPS 14.

Assuming use of a magnetic sensor for the pig passage detection. When the pig 10 travels through the location of the AGM 12, the magnetic field will increase as the pig approaches and the maximum magnetic field will be reached when the pig passes directly beneath the AGM 12. As the pig travels away from the AGM, the magnetic field will reverse and diminish. This change with respect to the signal indicates the exact time that the pig passes beneath the AGM 12 location. Typically, the accuracy can be at a one millisecond level. As soon as this time mark is detected, the AGM produces a signal to activate the GPS 14 to record position information. The pig passage can also be detected by acoustic methods or low frequency radio signal methods in a similar manner.

Conventionally, a GPS has three components. The first is the space module. It consists of 24 satellites orbiting around the earth at roughly 12 hour intervals at an altitude of 20 kilometers, each transmitting its position in space and almanac information. The second component is the ground control stations that track the satellites and periodically correct the ephemeris information for each satellite. The third component is the user equipment. In a user equipment component, the satellite signals are received and decoded through a process called signal correlation. This correlation process operates to produce a signal wave form that follows the position of the user equipment which can then be computed based on the time of arrival which represents the range or distance from the receiver and the satellite. It is this type of AGM that is used in accordance with the invention.

Typically, there are two types of measurements that may be obtained from a GPS. The first is a pseudo-range. It is termed pseudo-range because in it there are various types of errors, such as the satellite orbital error, satellite clock error, receiver clock error, tropospheric and ionospheric error, multi-path error and receiver noise. Each of these errors will contribute to the final position error. Through modeling of these errors, the pseudo-range measurement errors can reach a level of several meters, resulting in a position accuracy of about 10 meters horizontally and about 15 meters vertically. This is the position output that is generated directly from the GPS. This accuracy, however, is not suitable for accurate pig detection. In accordance with the invention, this is overcome by using a second GPS 16 to provide a carrier phase measurement. Carrier phase measurement constitutes a wave number count of the satellite signal after being locked in the receiver. Since each wave length is about 19 cm for L1 frequency of 1575.42 MHz, or 24 cm for L2 of 1227.60 MHz, a receiver can measure the wavelength accuracy to 1% and thus result in a much more accurate measurement. By the use of the second GPS 16 at a remote, known location within, for example, 20 km, the difference in the GPS 14 and GPS 16 signals can be used to correct the errors as discussed above to result in centimeter-level precision accuracy. The difficulty in this technique is that the initial count when the satellite is first locked is unknown. This unknown, which is termed "Initial Ambiguity", has to be solved to achieve the centimeter-level accuracy with respect to the position of the pig. In accordance with the invention, there is used processing that involves GPS raw measurements, including pseudo-range and carrier phase in combination with Kalman filtering and optimal ambiguity searching technology.

In the operation of the apparatus as shown in the FIGURE, the AGM 12 is activated when positioned on top of the pipeline p. As the pig passes beneath the AGM 12, it will activate the GPS 14 and thus signals will be generated with respect to the time and location of the pig as it passes beneath the AGM 12. The accuracy of this determination is implemented by the use of the remote GPS 16 to integrate the detection signal therefrom with the detection signal of GPS 14, as discussed above.

What is claimed is:

1. Apparatus for detecting the position of a device moving through a pipeline, the apparatus comprising means positioned at a first location above said pipeline for producing a first electrical signal in response to passage of said device through said pipe line at said first location and a second signal to activate a first global positioning system positioned at said first location to provide a third electrical signal indicating the position of said first location, and a second global positioning system positioned at a second selected, known location remote from said first location to provide a fourth electrical signal to correct said third electrical signal.

2. The apparatus of claim 1, wherein said means for producing said first electrical signal further includes means for collecting and storing said third and fourth electrical signals from the global positioning systems.

3. The apparatus of claim 2, wherein said first electrical signal may be activated by passage of said device through said pipeline at said first location.

4. The apparatus of claim 3, wherein said apparatus includes a computer for collecting said electrical signals, including collecting and carrier phased based double differencing said third and fourth electrical signals from said global positioning systems to provide a position signal of said first location and for integrating said first electrical signal indicative of said time and said position signal to provide an indication of the time of said device passing said position of said first location along said pipe line.

5. Apparatus for detecting the position of a device moving through a pipe line, the apparatus comprising an above ground marker positioned at a first location above said pipe line, for producing, collecting and storing a first electrical signal in response to and indicative of a time of passage of said device through said pipeline at said first location and a second signal to activate a first global positioning system positioned at said first location to provide a third electrical signal indicating the position of said first location, a second global positioning system positioned at a selected, known location remote from said first location to provide a fourth electrical signal to correct said third electrical signal, and a computer for collecting said first signal and carrier phased based double differencing said third and fourth electrical signals from said global positioning systems to provide a position signal of said first location and for integrating said first electrical signal indicative of said time and said position signal to provide an indication of the time of said device passing said position of said first location.

6. The apparatus of claim 5, wherein means activated by said above ground marker are provided at said first location for real time broadcasting of time of passage of said device at said first location and said position of said first location to a remote monitoring site.

7. The apparatus of claim 6, wherein said means for real time broadcasting is activated by said above ground marker when said device passes said first location.

8. The apparatus of claims 1, 2, 3, 4, 5, 6 or 7 wherein said device is a smart pig.

* * * * *